E. WALLS.
APPARATUS FOR MANUFACTURING AND PACKING CANDLES, NIGHT LIGHTS, AND SUCH LIKE ARTICLES.
APPLICATION FILED DEC. 24, 1918.

1,392,286.

Patented Sept. 27, 1921.
5 SHEETS—SHEET 1.

Inventor
Ernest Walls,
By Dodge and Sons
Asso. Attorneys.

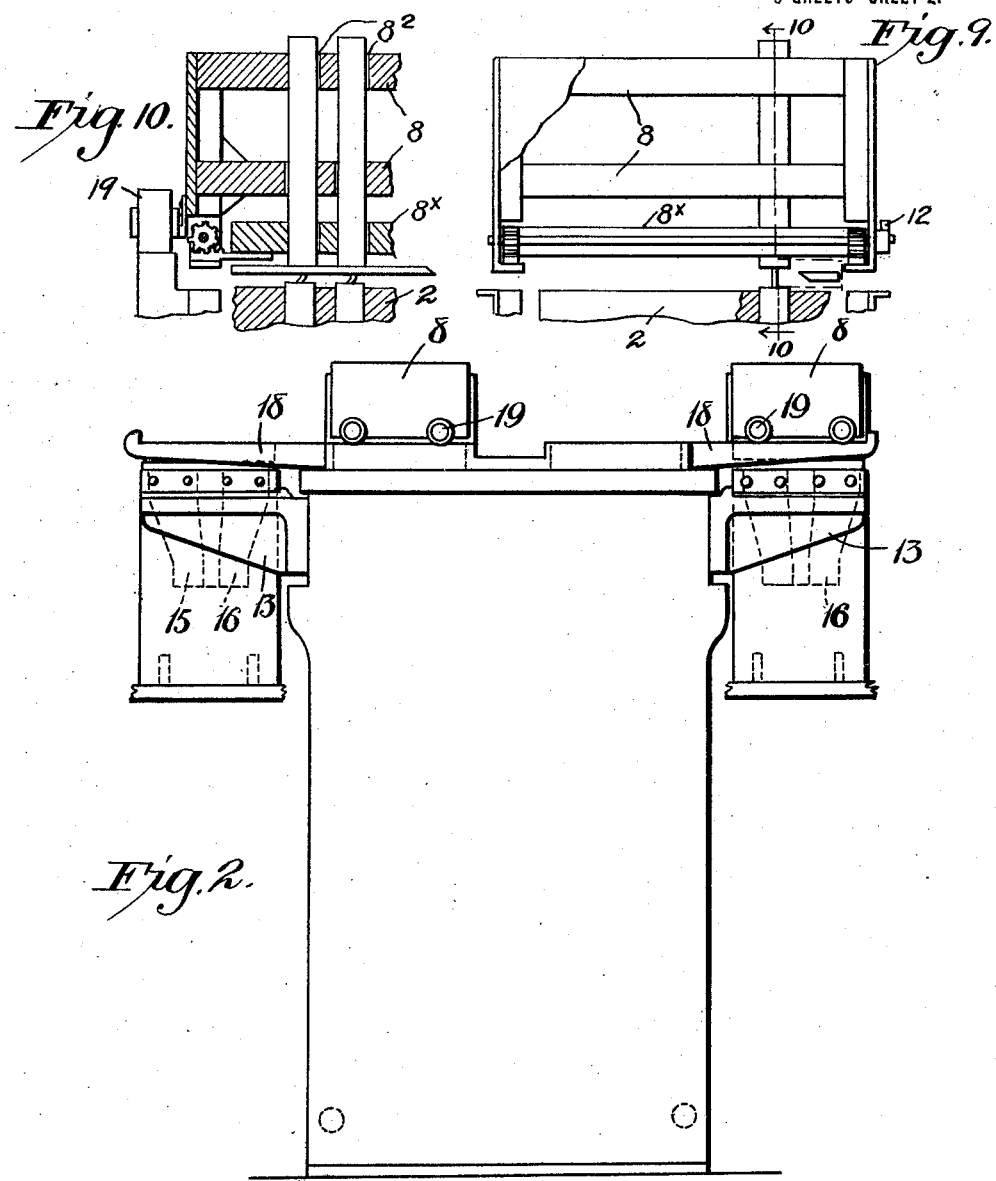

E. WALLS.
APPARATUS FOR MANUFACTURING AND PACKING CANDLES, NIGHT LIGHTS, AND SUCH LIKE ARTICLES.
APPLICATION FILED DEC. 24, 1918.

1,392,286.

Patented Sept. 27, 1921.
5 SHEETS—SHEET 3.

Inventor
Ernest Walls,
By Dodge and Sons,
Asso. Attorneys.

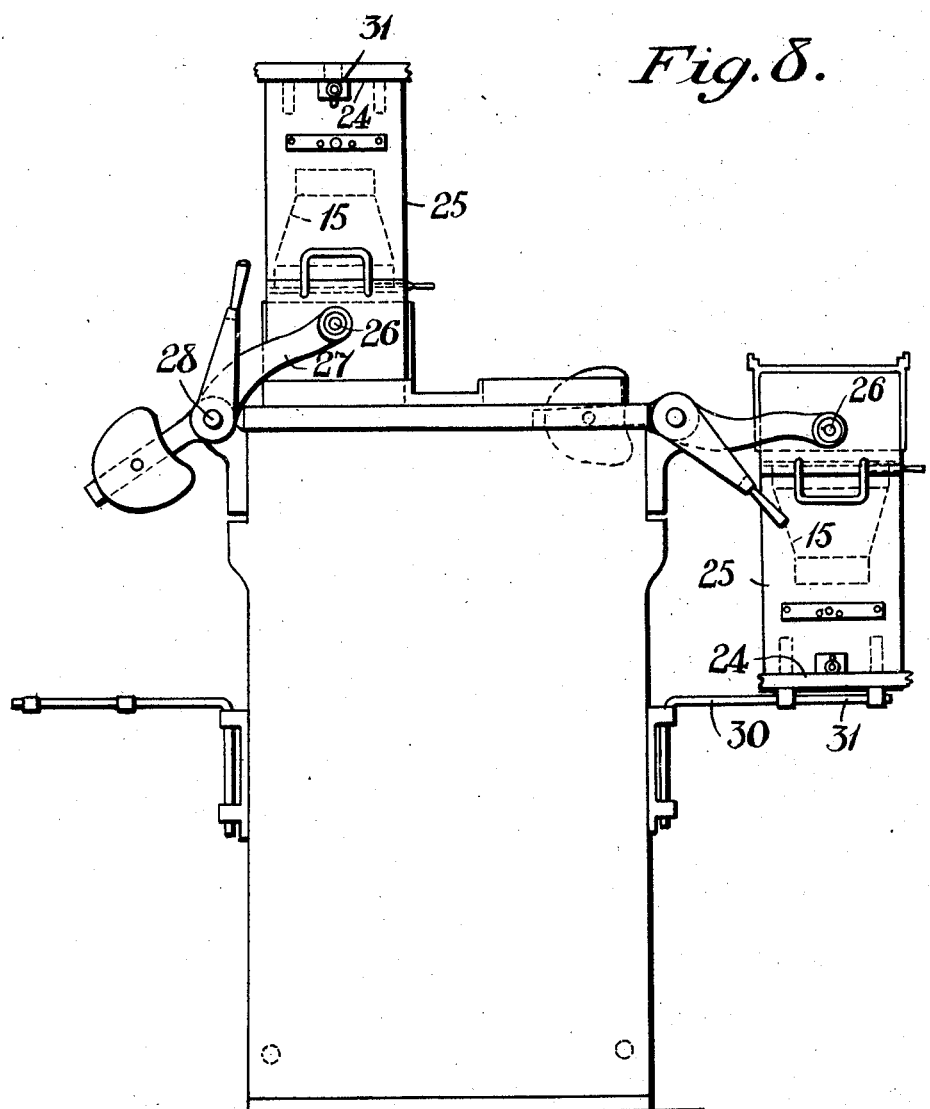

UNITED STATES PATENT OFFICE.

ERNEST WALLS, OF BRISTOL, ENGLAND.

APPARATUS FOR MANUFACTURING AND PACKING CANDLES, NIGHT-LIGHTS, AND SUCH LIKE ARTICLES.

1,392,286.     Specification of Letters Patent.     Patented Sept. 27, 1921.

Application filed December 24, 1918. Serial No. 268,199.

(GRANTED UNDER THE PROVISIONS OF THE ACT OF MARCH 3, 1921, 41 STAT. L., 1313.)

*To all whom it may concern:*

Be it known that I, ERNEST WALLS, a subject of the King of Great Britain, residing at Bristol, in the county of Gloucester and Kingdom of England, have invented certain new and useful Improvements in Apparatus for manufacturing and Packing Candles, Night-Lights, and such like Articles (for which I have filed applications in England Dec. 22, 1917, and July 13, 1918, Patent No. 119,359), of which the following is a specification.

This invention has reference to apparatus for manufacturing and packing candles, night lights and such like articles.

Prior to this invention it has been usual in manufacturing candles to discharge the whole batch of finished candles from the clamps indiscriminately into a tray or holder from whence they were transported to the packing table to be packed by hand into packages, usually bags or cartons, thus involving a good deal of hand labor and trucking or carrying. According to the present invention the candles are not only manufactured by the machine, but they are also packed automatically into cartons or bags without undergoing substantially any hand manipulation, thus considerably expediting the packing process.

The invention is characterized by this, that the molds for the candles and the candle holes in the clamps are grouped in clusters corresponding in position and number to the finished candles in the package, so that when the candles are released from the clamps after being expelled from the molds they fall direct into the empty packages thus filling them direct from the candle machine without any intermediate sorting or counting whatever. The invention furthermore embodies a device for compressing the candles closer together when released from the clamp, so that they will pack themselves together in the package sufficiently close to prevent them shaking about; and it also embodies means by which the clamps can be moved clear of the molds to allow the candles to fall by gravity into the packages. The invention is applicable to the manufacture of candles with plain, tapered or fluted ends and to any size of molded candles, also to the manufacture of night-lights and such like articles.

The invention will be understood from the following description, reference being had to the accompanying drawings, in which:—

Fig. 2 is an end view thereof;

Fig. 8 is an end elevation thereof showing the clamp in the charging and discharging position, Fig. 9 is a fragmentary elevational end view of one of the candle clamps, certain parts thereof being broken away for the sake of clearness; and Fig. 10 is a section taken on the line 10—10 of Fig. 9.

Figure 3:
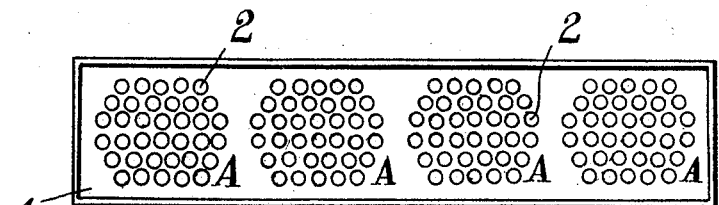
Fig. 3 is a plan view of the candle molds grouped into clusters.
Figure 1:
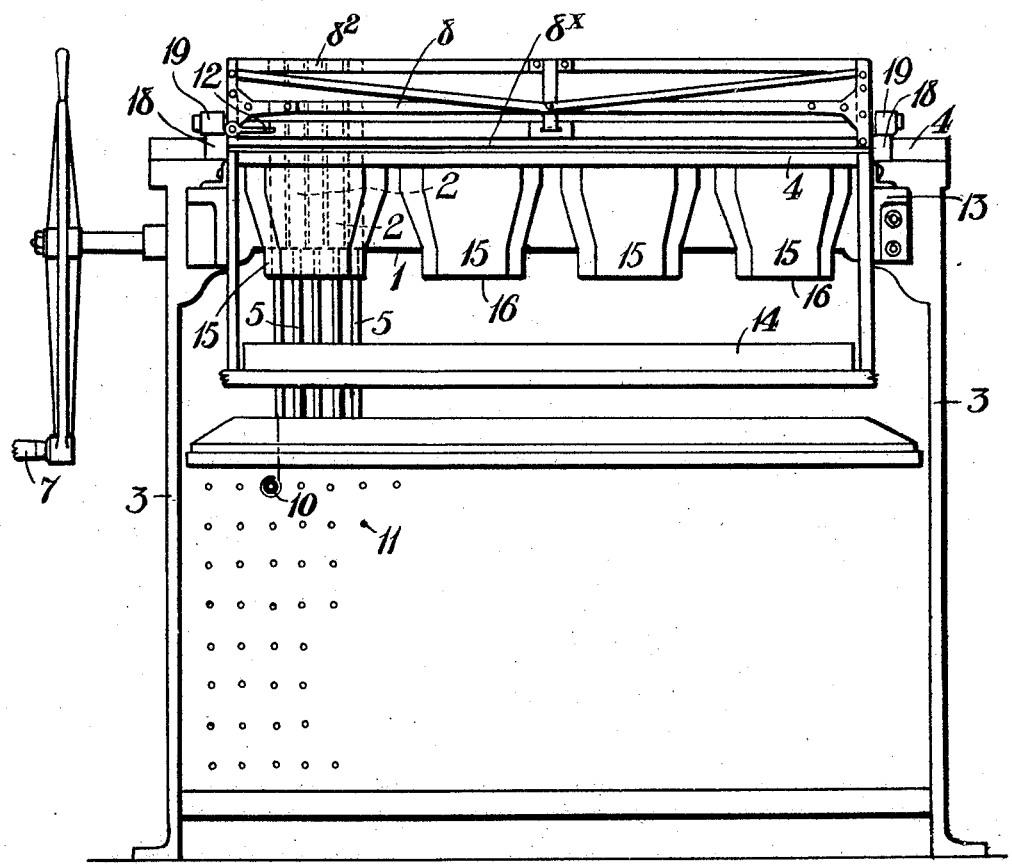
Figure 1 is a side elevation of a machine for molding candles with my invention applied thereto.

Referring first to Figs. 1, 2, 3, 9 and 10, a water-tight box 1 containing a plurality of perpendicular molds 2 is supported in the framework 3 of the machine. At their upper ends these molds communicate directly with the trough or tray 4 so that the molten candle material that is fed into the trough 4 flows into and is equally distributed in the molds 2, the water filled box causing the mass in each mold to more quickly cool and set. 5 are the usual rods or pushers secured at their lower ends in the frame 6 which is fitted to slide up and down by the turning of the handle 7, so as to move the pushers up through the molds to eject the molded candles into the clamps 8, or draw them down preparatory to a fresh supply of molten candle material being fed into the trough 4, the rods or pushers 5 being tubular so as to allow for the passage of the wicks 9 from the bobbins 10 which are mounted on the skewers 11. The candle clamps 8 which are arranged above the molds are capable of receiving the candles that are passed thereinto from the molds and grip them in the usual manner, as for instance by clamping plates or boards 8ˣ adapted to slide lengthwise by the operation of the handle 12 and thereby grip the sides of the candles when passed into the clamp from the molds 2, as will clearly appear from Figs. 9 and 10, wherein several of the finished candles are shown held by the candle clamp preparatory to cutting the wicks by means of a swinging or sliding knife 32, operated by any suitable means, not shown.

The machine so far described is substantially similar to known candle making machines, but by the present invention I arrange the molds 2 in groups or clusters A corresponding in number and position to the finished candles in the package, each group A of molds being spaced apart. The candle holes $8^2$ in the plates or boards of the clamp 8 are also arranged in groups or clusters so as to exactly correspond with the groups of molds of the machine and to register with the said molds when the clamp is in position above the watertight box. The bobbins 10 may also be arranged in groups if desired though this is not absolutely essential, so long as the wicks 9 can be drawn up centrally through the molds of each group. The particular machine shown in the drawing is a duplex one, there being two sets of molds of four groups each, that is to say four groups at the front of the machine, and four groups at the rear, and all the other working parts of the machine are duplicated. The number and position of molds in each group A, and the number and position of candle holes in each group in the clamp, correspond to the number and position of the finished candles in each packet. Thus if thirty-six candles are to be packed into each packet, there are thirty-six molds in each group A and thirty-six candle holes in each group in the clamp, while if only three candles are to be packed into each packet there are only three molds in each group A and three candle holes in each group in the clamp. The number in each group may be varied in any way according to the number of candles to be packed in each packet, the number of molds in each group and the number of candle holes in each group in the clamp being always made to correspond.

At front and back of the machine (in the case of a duplex apparatus) or at front only (in the case of a single one) there is mounted by means of brackets such as 13 a framework the lower part of which carries a tray 14 for the packets while the upper part 15 has apertures to each of which is affixed a tapering hopper or chute 15 of inverted frustal shape, the throat 16 at the delivery end being smaller than the mouth at the upper end. The throat at the lower end is of such size and shape that it will take into the top of a packet in which the candles are to be packed while the mouth of the hopper at the upper end is somewhat larger than the space occupied by a group of candle holes in the clamp, the object being to deliver the candles when discharged from the clamp into a packet, and to compress the candles closer together during their passage through the hopper, so that they will pack themselves closely in the packets though without crushing them and yet prevent their unduly shaking about.

The clamps 8 are mounted on trackways 18 which extend from front to back of the machine the ends of each trackway being arranged to overhang so that the clamps 8 can be brought either into register with the hoppers 15 or into register with the molds 2. The clamps are by preference provided with small rollers 19 which run on the trackways 18 to insure the clamps being readily shifted, and means are provided for locking the clamps either in register with the hoppers or in register with the molds.

The mode of operation will now be apparent. The wicks 9 from the respective groups of bobbins 10 are drawn up through the groups of push rods 5 to the top of the candle molds 2, care being taken to center the wicks properly for the first molding, and the molten candle material is poured into the trough 4 so as to flow into and fill the candle molds. When the candles are cool enough to draw, the residue of the candle material is removed from the trough by means of a knife and the handle 7 being turned, the tubular rods 5 push the groups of candles up into the groups of candle holes in the clamps 8 which keep the wicks properly centered for the next molding. Member 8ˣ is then operated by handle 12 to grip the candles in the clamp 8. The handle 7 is turned again to lower the tubular rods 5, a fresh supply of molten candle material is poured into the molds and the wicks are cut by a knife 32 which cuts the whole of each group of wicks at one sweep or stroke, and then the clamps are rolled along the trackways 18 until they come into register with the hoppers. The clamp handles 12 are operated whereupon the candles fall down between the converging walls of the hoppers 15 into the packets which rest on the tray 14, and pack themselves thereinto thus filling the packets direct from the candle machine without any intermediate sorting or counting. It will therefore be seen that the candles are manufactured and then packed without any hand manipulation whatever. The clamps 8 are rolled back into register with the molds 2 and the operation is repeated.

Figure 4:
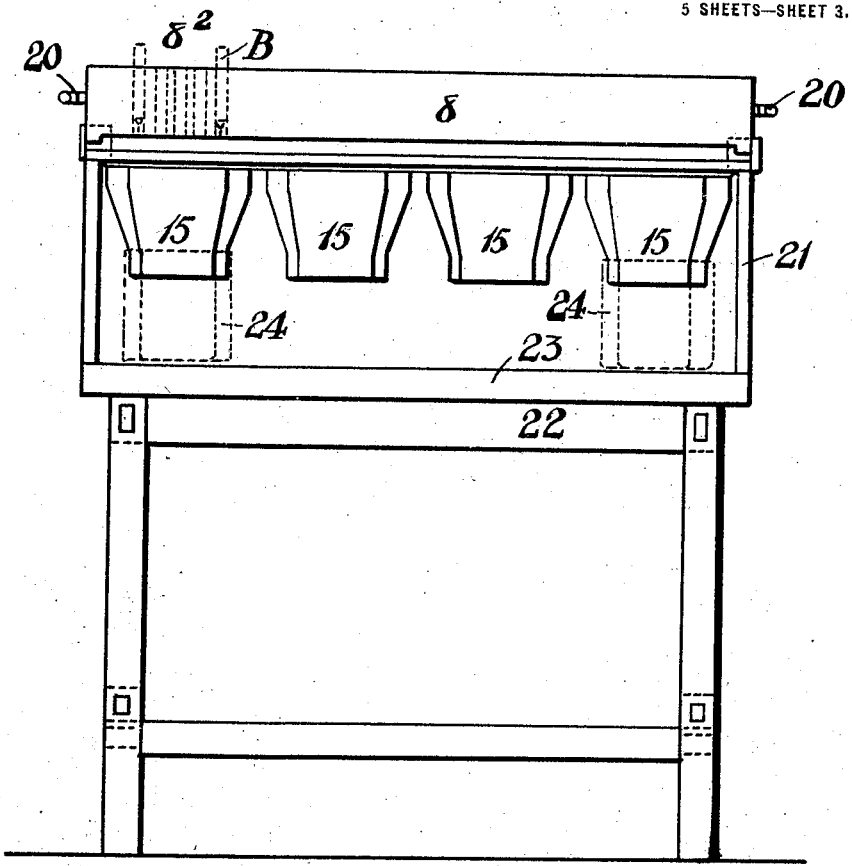
Fig. 4 is a side elevation of the candle clamp removed from the candle making machine and placed upon a table.
Figure 5:
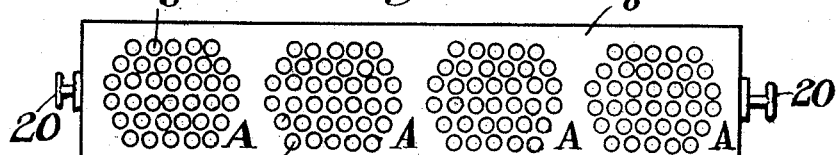
Fig. 5 is a plan view thereof showing the candle holes in the clamp grouped in clusters.
Figure 6:
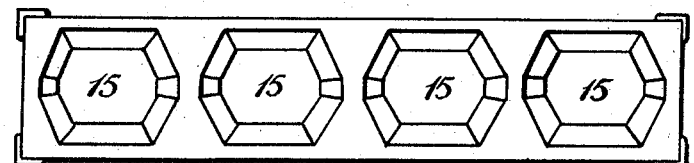
Fig. 6 is a plan view of the framework which carries the tapering hoppers.

Instead of arranging the clamps so that they can be moved along trackways to bring them into register with the hoppers as previously described, such clamps containing the finished candles can be arranged so that they can be lifted bodily by hand or otherwise and placed over hoppers on an adjacent packing table reference being had to Figs. 4, 5 and 6. In this case the clamps 8 are received at the top of the frame or standards of the machine so as to be supported with their groups or clusters of candle holes in register with the groups or clusters of candle molds, and they are provided with handles 20 at the ends by which they can be lifted and transported by hand to the table. When the candles two of which are shown at B have been pushed up from the molds into a clamp 8 and gripped thereby, and the wicks connecting the candles in the clamp with the candles in the molds have been cut, the clamp is lifted by the handles 20 and carried to a framework 21 which stands upon an adjacent table 22. The lower part of this framework carries a tray 23 for the packets 24 while the upper part has apertures to each of which is affixed a tapering hopper 15 similar to those hereinbefore described. The clamp 8 is dropped into recesses at the upper part of this framework so that its groups of candle holes $8^2$ are held in register with the hoppers 15, and the candles are unlocked so that groups or clusters of candles fall down their respective hoppers into the packets 24 on the tray 23. If desired the hoppers might be secured direct to the top of the clamps so that they shall project upward with the delivery ends or throats uppermost; then when the candle holes in the clamps have been filled with candles the clamp is lifted from the machine, carried to the packing table, and inverted so that the hoppers now project downward. At the packing table the clamp is laid upon a frame which supports the hoppers above the table to allow packets to be placed underneath, so that when the candles are released they fall through the hoppers into the packets and automatically pack themselves therein.

Figure 7:
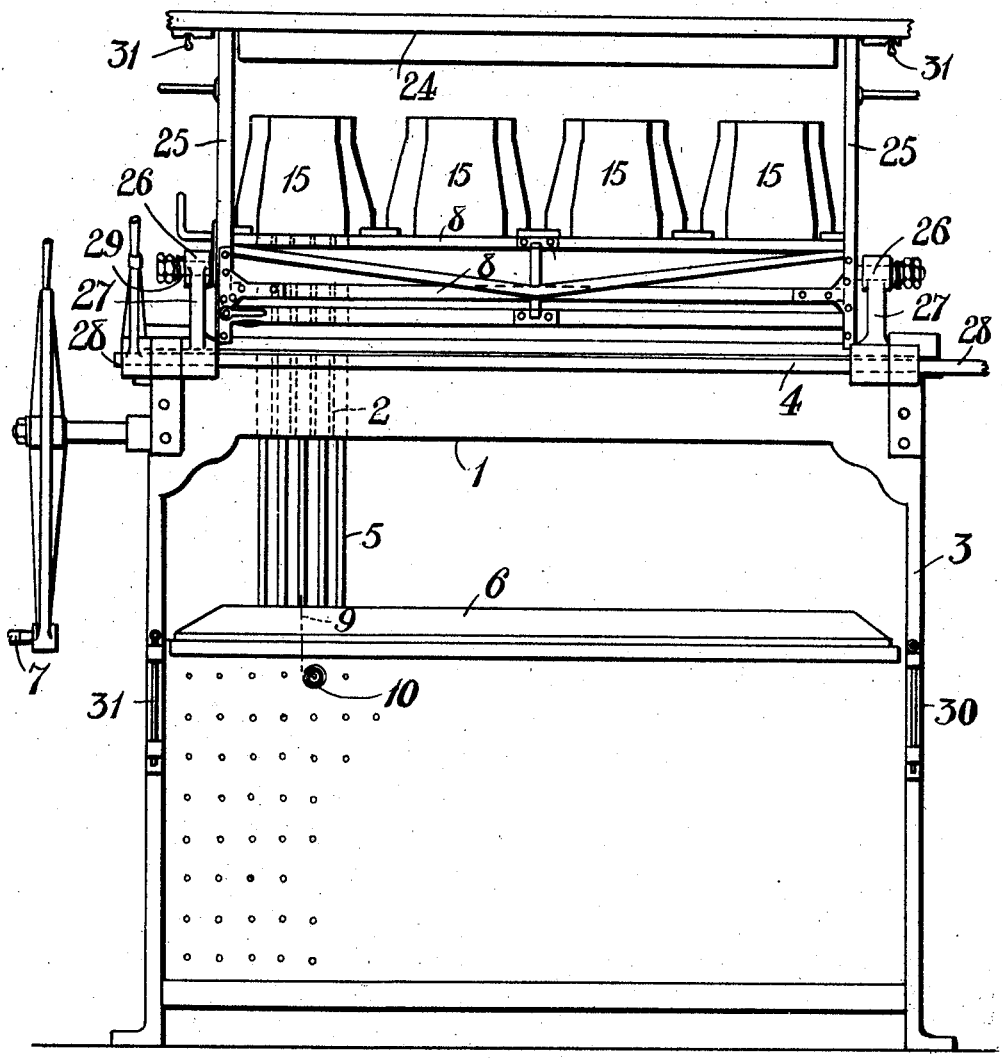
Fig. 7 is a side elevation of a candle molding machine of the kind in which the clamp can be turned on pivots.

My invention can also be applied to that type of candle molding machine in which the clamp is pivoted on the frame, so that it can be tilted or swung into a position in which its candle holes register with the molds or into another position clear of the machine to allow the candles to fall clear. This application of the invention is shown in Figs. 7 and 8 in which 8 is the clamp to the top of which the hoppers 15 are fixed so that they project upward with the delivery ends or throats uppermost, the larger end of the hoppers being big enough to encircle the space occupied by a group or cluster of candle holes in the clamp. Above the hoppers an inverted tray 24 is supported on the clamp by standards 25, and the space between the tray and the throats of the hoppers 15 is adapted to receive the cartons, one for each hopper. The clamp is pivoted at 26 in counterweighted arms 27 mounted on a shaft 28, and the pivots are provided with braking springs 29 to prevent the clamp from moving too easily. In the position shown in Fig. 7 and at the left hand of Fig. 8, the groups of candle holes in the clamp register with the groups of candle molds 2 so that the candles in the molds can be moved by the tubular rods 5 into the candle holes in the clamp and be gripped therein while the next series of candle groups are being formed. The wicks connecting the candles in the clamp with the candles in the molds are then cut, and the clamp is tilted or swung by means of its arms 27 into a position in front of the machine and is turned upside down on its pivots 26 into the position shown at the right hand side of Fig. 8 so that the throats of the hoppers are now at the bottom with the tray below them. The grip on the candles is now released so that they fall into the packets on the trays. In the turned down position the tray rests upon bracket arms 30 which are supported by the frame of the machine, and this tray can be disconnected from the standards 25 by unfastening the catches 31 so that the hoppers can be swung clear of the packets.

Although I have described my invention more especially in connection with the manufacture and packing of candles, yet it can also be applied to the manufacture and packing of night lights and such like articles.

I declare that what I claim is:—

1. In an apparatus for manufacturing and packing candles or the like, comprising in combination groups of candle molds, the molds in each group corresponding in position and number to the finished candles in the package; and a candle clamp for receiving the finished candles from the molds, said clamp being provided with candle holes corresponding in position and number to said candle molds, whereby the candles, upon release from said clamp, are positioned in the packages without intermediate sorting or counting.

2. In an apparatus for manufacturing and packing candles or the like, comprising a candle clamp the combination with each group of holes in the candle clamp of a tapering chute through which the candles or the like when released from the clamp fall by gravity, and by which said candles are disposed more closely together in the package.

3. In an apparatus for manufacturing and packing candles or the like, the combination of a plurality of candle molds; a plurality of tapering chutes; and a movable candle clamp adapted to register with said molds to receive the finished candles therefrom or with said chutes to discharge the candles thereinto.

4. In an apparatus for manufacturing and packing candles or the like, the combination of a group of candle molds; a candle clamp for receiving the finished candles from said molds; and a tapering chute through which the candles when released from the clamp fall into the package and by which they are disposed more closely together in the package.

5. In an apparatus for manufacturing and packing candles or the like, the combination of a group of candle molds, the molds in said group being arranged to correspond to the disposition of the finished candles in the package; and a tapered chute through which the finished candles fall into the package and by which they are disposed more closely together in the package.

6. In an apparatus for manufacturing and packing candles or the like, the combination of a group of candle molds, the molds in each group corresponding in position and number to the finished candles in the package, a candle clamp provided with candle holes corresponding in number and position to said candle molds; and a tapering chute for each of said groups of candle molds through which the finished candles when released from the said clamp fall into the corresponding package and by which they are disposed more closely together in the package.

In witness whereof I have hereunto signed my name this 5th day of December, 1918, in the presence of two subscribing witnesses.

ERNEST WALLS.

Witnesses:
E. TYLER,
ALAN E. LONG.